Patented Nov. 25, 1930

1,782,724

UNITED STATES PATENT OFFICE

ERWIN HOFFA AND HANS HEYNA, OF HOCHST-ON-THE-MAIN, GERMANY, ASSIGNORS TO GENERAL ANILINE WORKS, INC., OF NEW YORK, N. Y., A CORPORATION OF DELAWARE

TRIMETHYLTHIONAPHTHENE VAT DYESTUFFS

No Drawing. Application filed March 30, 1928, Serial No. 266,106, and in Germany April 11, 1927.

Our present invention relates to new vat dyestuffs and process of preparing them.

The thioindigo dyestuffs substituted in 4- and 6-position give dyeings which are partly distinguished by the clearness of their tints and an excellent fastness to boiling. A dyestuff meeting at the same time the highest requirements as to fastness to light has, however, hitherto not been known in this series of dyestuffs.

We have found that the 4-6-7,4'-6'-7'-hexamethylthioindigo has an unusually good fastness to light, besides the other good tinctorial properties possessed by certain members of this series.

The said dyestuff can be obtained by subjecting the 3-5-6-trimethylbenzene-1-thioglycollic acid or a substitution product thereof containing in 2-position the carboxyl-, carboxylic acid-amide- or cyanogen group, of the formula:

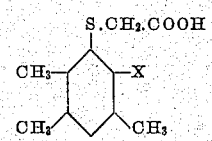

wherein X stands for hydrogen, CN, $CONH_2$ or COOH, to condensation according to one of the usual methods and oxidizing the hydroxythionaphthene thus produced so as to form the desired dyestuff.

We have furthermore found that also the products, obtainable by condensing the new hydroxythionaphthene according to the usual methods, exhibit fastness properties similar to those of the dyestuff obtainable by oxidizing the said hydroxythionaphthene. The new dyestuffs contain the following atomic grouping:

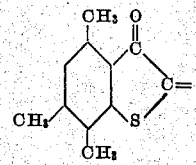

The following example illustrates the invention, the parts being by weight:

35 parts of 3-5-6-trimethylbenzene-1-thioglycollic acid-2-nitrile are dissolved in 1200 parts of water, 20 parts of caustic soda solution of 40° Bé. and 5 parts of sodium sulfide. When dissolution has taken place, there are furthermore added 180 parts of caustic soda solution of 40° Bé. and the whole is stirred for 2 hours at 80° C. to 85° C. The separation of the sodium salt of the 4-6-7-trimethyl-3-amino-1-thionaphthene-2-carboxylic acid begins already on heating the solution and is nearly complete after the addition of 100 parts of sodium chloride. After filtering by suction and washing with a sodium chloride solution, the moist paste is dissolved in twenty times its weight of water with the addition of small quantities of caustic soda solution and bisulfite, the whole is filtered, the filtrate is acidified with dilute sulfuric acid and heated on the water bath until the formation of the hydroxythionaphthene is complete. After cooling, the hydroxythionaphthene is filtered by suction, washed and transformed into the dyestuff according to one of the known methods.

The 4-6-7-,4'-6'-7'-hexamethylbisthionaphtheneindigo dissolves in sulfuric acid to a green solution. It dissolves when being vatted to a yellow solution and produces on cotton clear red dyeings of excellent fastness to boiling and extraordinarily good fastness to light.

The 3-5-6-trimethylbenzene-1-thioglycollic acid-2-nitrile can be prepared by exchanging in the 1-amino-2-nitro-3-4-6-trimethylbenzene the amino group for cyanogene, reducing the nitro group and exchanging in the 1-cyano-2-amino-3-4-6-trimethylbenzene thus obtained the amino group for the group $S.CH_2.COOH$ according to one of the known methods.

We claim:

1. As new products, vat dyestuffs containing the following atomic grouping:

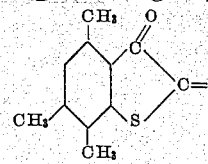

the said dyestuffs yielding dyeings of excellent fastness properties.

2. As new products, vat dyestuffs of the following formula:

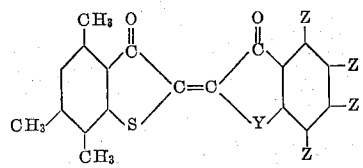

wherein Y stands for S or NH and Z for hydrogen or any substituent, yielding dyeings of excellent fastness properties.

3. As new products, vat dyestuffs of the following formula:

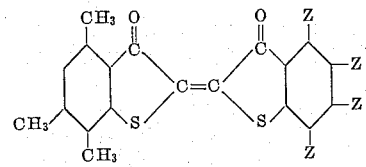

wherein Z stands for hydrogen or any substituent, yielding dyeings of excellent fastness properties.

4. As new products, vat dyestuffs of the following formula:

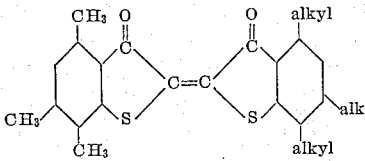

being red powders, soluble in sulfuric acid to a green solution dissolving when vatted with a yellow coloration and dyeing cotton clear red tints of excellent fastness to boiling and extraordinarily good fastness to light.

5. As a new product, the vat dyestuff of the following formula:

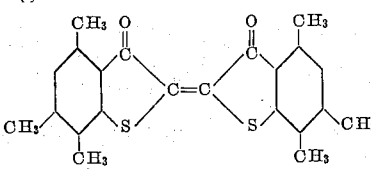

being a red powder, soluble in sulfuric acid to a green solution dissolving when vatted with a yellow coloration and dyeing cotton clear red tints of excellent fastness to boiling and extraordinarily good fastness to light.

In testimony whereof, we affix our signatures.

ERWIN HOFFA.
HANS HEYNA.